(12) United States Patent
Volk

(10) Patent No.: US 6,699,117 B2
(45) Date of Patent: Mar. 2, 2004

(54) RETAINER FOR POULTRY HOCKS

(75) Inventor: Daniel J. Volk, Alpharetta, GA (US)

(73) Assignee: Volk Enterprises, Inc., Turlock, CA (US)

(*) Notice: Subject to any disclaimer, the term of this patent is extended or adjusted under 35 U.S.C. 154(b) by 0 days.

(21) Appl. No.: 10/114,234

(22) Filed: Apr. 2, 2002

(65) Prior Publication Data

US 2003/0186640 A1 Oct. 2, 2003

(51) Int. Cl.[7] ................................................ A22B 5/00
(52) U.S. Cl. ....................................................... 452/198
(58) Field of Search ............................ 452/198, 53, 54, 452/167, 188, 187

(56) References Cited

U.S. PATENT DOCUMENTS

| | | | | |
|---|---|---|---|---|
| 671,900 A | * | 4/1901 | Stanetert | 452/188 |
| 747,606 A | * | 12/1903 | Hildebrandt | 452/188 |
| 1,532,974 A | * | 4/1925 | Alber et al. | 452/188 |
| 1,561,109 A | * | 11/1925 | Platt et al. | 452/188 |
| 1,660,583 A | * | 2/1928 | Shrauger | 452/80 |
| 1,742,569 A | * | 1/1930 | Barker | 452/188 |
| D116,816 S | * | 9/1939 | Dick | D8/371 |
| 2,438,608 A | * | 3/1948 | Johnson | 452/188 |
| 2,685,706 A | * | 8/1954 | Zebarth | 452/188 |
| 3,152,360 A | * | 10/1964 | Fox et al. | 452/188 |
| 5,112,274 A | | 5/1992 | Volk | |
| 5,292,277 A | * | 3/1994 | Volk et al. | 452/174 |
| 5,498,201 A | | 3/1996 | Volk | |
| 5,735,736 A | | 4/1998 | Volk | |
| 5,749,778 A | | 5/1998 | Volk | |
| 5,944,599 A | * | 8/1999 | Volk et al. | 452/174 |
| 6,085,453 A | | 7/2000 | Volk | |

\* cited by examiner

Primary Examiner—Thomas Price
(74) Attorney, Agent, or Firm—Technoprop Colton LLC

(57) ABSTRACT

A device for retaining and trussing the hocks of poultry carcass in juxtaposition and proximal to the body during processing, packaging, shipping, storage, and/or cooking. The present invention is a unitary, plate-like member of resilient material comprising two generally C-shaped members for fitting about and retaining the hocks. The generally C-shaped members are located proximally to each other and about an axis of symmetry.

23 Claims, 4 Drawing Sheets

RETAINER FOR POULTRY HOCKS

BACKGROUND OF THE INVENTION

1. Technical Field

The present invention relates generally to a device for retaining or trussing the hocks of poultry carcasses and more particularly to a retainer comprising two generally C-shaped elements that can engage the hocks of a poultry carcass to retain the thighs in juxtaposition during processing, packaging, shipping and possibly cooking.

2. Prior Art

As is appreciated by those skilled in the art, the processing, packaging and shipping of poultry carcasses can be made easier by creating relative uniformity amongst trussed poultry carcasses. For example, if the hocks of poultry carcasses are protruding from the animal carcass, then the extending limbs can tear the shrink-wrap. Trussing the hocks, thereby holding the legs together close to the body, can help to avoid this problem. Further, it is easier to cook a trussed poultry carcass, especially on a rotisserie, as the legs will be retained against the body and not flop about. Similarly, as the poultry carcasses can be cooked more easily, there is an added benefit of trussing poultry carcasses to consumers, and this can be exploited by advertising by the retailer.

Over the years, many brackets, clamps, retainers, and similar devices have been developed for retaining or trussing the hocks of poultry carcasses during cooking, shipping, and processing. Not surprisingly, the prior art discloses many means for trussing the hocks of poultry carcasses. While the known prior art has advantages for certain situations, there is a constant need for poultry trussing devices that are less expensive to manufacture, are easier to mount on the hocks, hold the hocks more securely, can be mounted automatically if desired, or easier to dismount from the hocks, or combinations of these. A couple of exemplary trussing devices are discussed below.

U.S. Pat. No. 5,112,274 to Volk discloses a snap-on ankle strap poultry trussing device that provides a plastic ankle strap that has a lower portion having an indent that extends upwardly between the exposed hocks of the carcass. The ankle strap is slipped over the exposed hocks, grasps the ankles of the poultry carcass, and holds them together.

U.S. Pat. No. 5,498,201 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the hocks in juxtaposition.

U.S. Pat. No. 5,735,736 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the legs substantially perpendicular to the retainer and parallel to each other.

U.S. Pat. No. 5,749,778 to Volk discloses a retainer for poultry hocks that is formed as a ring of a thin unitary plastic material. The ring has hinged flaps extending inward from opposite sides thereof. The poultry hocks are inserted through the ring to cause the flaps to bend outward and then to partially retract backward so that the edges of the flaps engage behind the hock knuckles, holding the thighs close to the body of the fowl. Preferably, either the ring or the flaps are cut away to increase the length of the hinge area.

The present invention is directed towards providing a retainer generally for trussing poultry carcasses and specifically for fitting about the hocks so as to hold the legs proximal to each other. The present invention also is directed towards a relatively simple device that can be manufactured simply and inexpensively, and easily is mounted on and dismounted from the hocks automatically by machine or manually by personpower. The present invention further is directed towards a hock retainer that has less interaction or contact with packaging materials.

BRIEF SUMMARY OF THE INVENTION

Briefly described, the present invention is a device for retaining and trussing the hocks of poultry carcass in juxtaposition and proximal to the body during processing, packaging, shipping, storage, and/or cooking. The present invention is a unitary, plate-like member of resilient material comprising two generally C-shaped members for fitting about and retaining the hocks. As the generally C-shaped members are located proximally to each other and about an axis of symmetry (the generally C-shaped members are mirror images of each other about the axis of symmetry), the general structure of the retainer also resembles a W- or M-shaped structure or, in certain embodiments, a crown- or upside down crown-shaped structure.

Each of the generally C-shaped members has two arcuate arms that define a receiving cavity with an entrance slot. The receiving cavities provide means to retain a single hock of a leg of a poultry carcass. As each of two receiving cavities can be mounted on or engage a single hock of a leg of a poultry carcass and as the receiving cavities are proximal, the engagement of the two hocks of the legs of the poultry carcass by the retainer retain the hocks of a single poultry carcass in juxtaposition proximal to each other.

The retainer can be mounted on the hocks by a single upward or downward motion of the retainer over the hocks. As the retainer is placed, or snapped, over the hock, the hock passes through the entrance slot and enters the receiving cavity of a retaining member of the retainer. To allow entrance to the respective receiving cavities, the arcuate arms of the generally C-shaped members can deflect and/or flex sideways and/or outward to allow the hock to enter the retainer. As the hock enters and becomes secured in the retaining members, the arcuate arms return to their originally positions, which effectively secures the hock in the retaining members. Because the generally C-shaped members are juxtaposed and the hocks of the poultry carcass are loaded into the C-shaped members, the loading of the hocks into the retainer conveniently juxtaposes the hocks proximal to each other.

The relatively simple mechanism for loading the retainer with the hocks of the poultry carcass can allow for efficient mounting by hand or by automation. Poultry processing workers use an upward or downward motion to the mount the retainer onto the hocks. Alternatively, as the retainer can have a generally plate-like configuration, which is an optimal shape to be fitted in an automated poultry-processing machine, the retainer can be incorporated efficiently into an automated process or operation. The retainer can have a slot for mounting onto a supply bar either for storing a number of the retainers or for feeding the retainers into an automated retainer-mounting machine. Further, as the present invention has a generally simple structure, the device can be manufactured relatively easily and inexpensively and can be mounted quickly and efficiently on the hocks with a single snapping motion.

These features, and other features and advantages of the present invention, will become more apparent to those of ordinary skill in the relevant art when the following detailed description of the preferred embodiments is read in conjunction with the appended drawings in which like reference numerals represent like components throughout the several views.

DETAILED DESCRIPTION OF THE PREFERRED EMBODIMENTS

Illustrative embodiments of the retainer 10 according to the present invention are shown in FIGS. 1 through 6. Initially, retainer 10 may be used to retain the hocks of any type of poultry carcass 30, and the carcass shown in the figures is meant to represent a generic poultry carcass and not a carcass of any particular type. Further, while the invention will be described in conjunction with the preferred embodiments, it will be understood that the invention is not limited to these embodiments.

Figure 1:
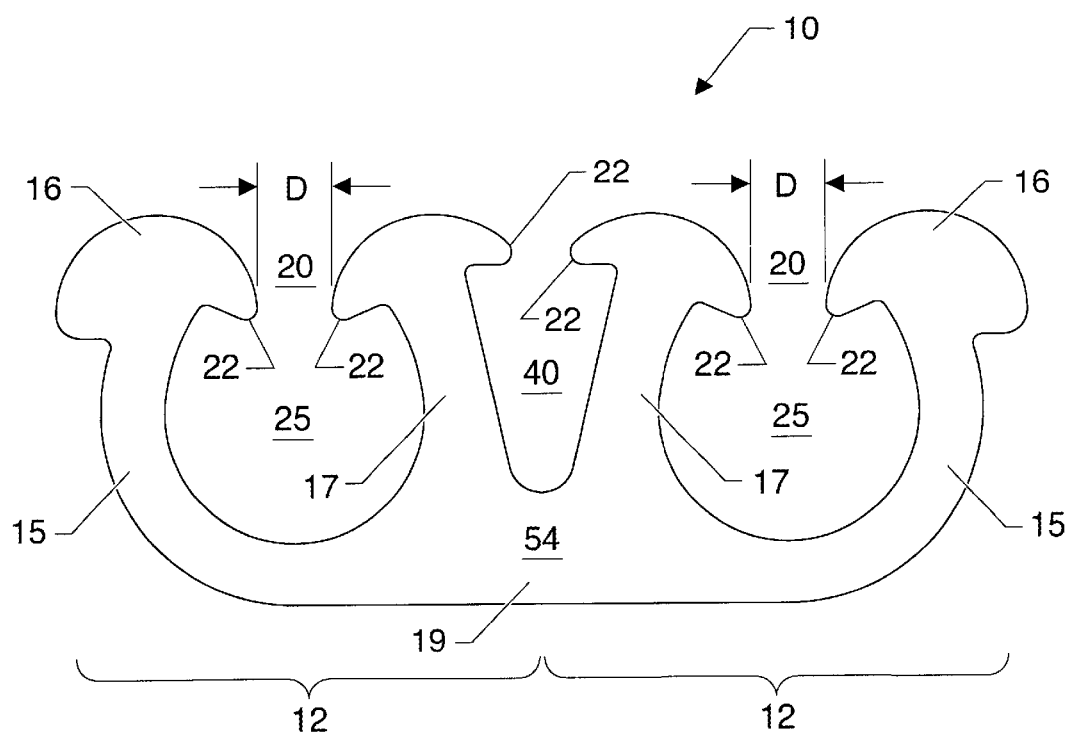
FIG. 1 is a front view of a first embodiment of the retainer of the present invention.
Figure 2:
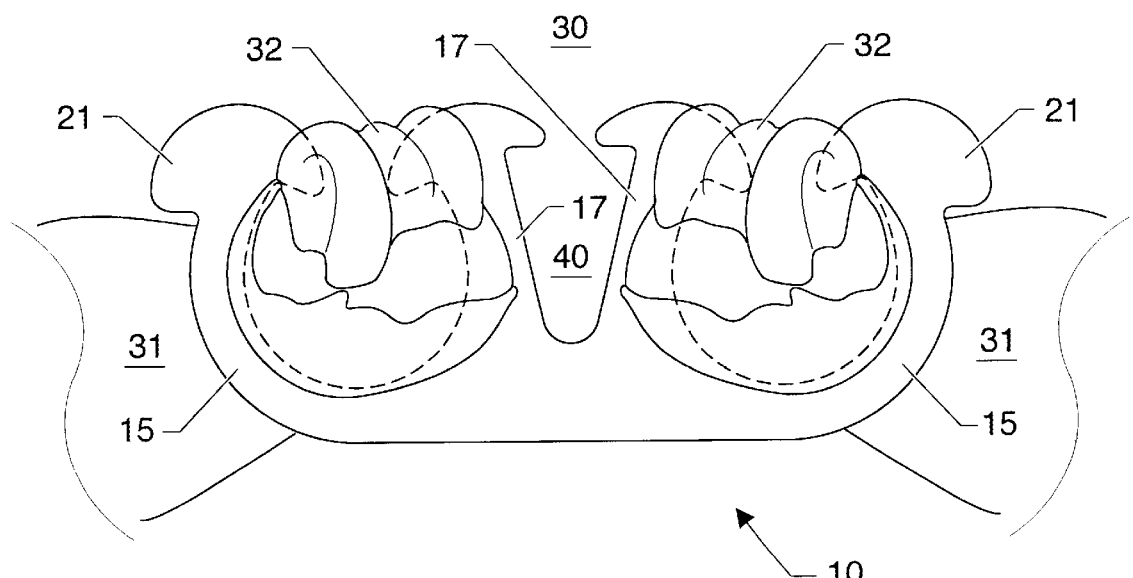
FIG. 2 is a perspective view of the retainer of FIG. 1 as mounted on the hocks of a poultry carcass.

Referring now to FIGS. 1 and 2, a first embodiment of retainer 10 generally is a plate-like member of resilient material having one axis of symmetry between two retaining members 12 of equal dimensions. More specifically, retainer 10 comprises a pair of retaining members 12 juxtaposed about the axis of symmetry. Each retaining member 12 is generally C-shaped and comprises an outer arcuate arm 15 and an inner arcuate arm 17 that extend from base 19 of retainer 10. Preferably, the distal ends 16 of outer arcuate arms 15 are separated by distance D from the distal ends 18 of inner arcuate arms 17. One or more of distal ends 16, 18 preferably have inwardly extending prongs 21. Distal ends 18 may further comprise outwardly extending prongs 22.

Each retaining member 12 defines a single receiving cavity 25 into which a hock 32 is placed. As the retaining members 12 are proximally located to each other in a substantially unitary structure, the overall structure of a first embodiment of retainer 10 resembles very generally the letter W or M. Prongs 21 of distal ends 16, 18, or distal ends 16, 18 themselves in an alternate embodiment lacking prongs 21, define an entrance slot 20 to each receiving cavity 25 of each retaining member 12. As prongs 21 can have a generally smooth or rounded convex edge external of receiving cavity 25, prongs 21 can allow for a more contoured lead-in of hock 32 into receiving cavity 25. Preferably, hocks 32 can be slid or snapped through the contoured lead-in created by prongs 21 into receiving cavities 25 of retaining members 12. Somewhat more specifically, retainer 10 is for use with a poultry carcass 30 having a pair of hocks 32 that terminate in knuckles 33. As shown, the application of retainer 10 to poultry carcass 10 retains hocks 32 together in juxtaposition, which can be particularly advantageous during processing, packaging, shipping, storing, and/or cooking.

Once hocks 32 are placed receiving cavities 25, the generally convex edge of prongs 21 internal to receiving cavity 25 further secure hocks 32 within retainer 10. Optionally, prongs 21 have points that extend centrally and/or inwardly relative to receiving cavity 25. These inwardly extending points can contact hocks 32 and help prevent slippage of retainer 10 along or off of hocks 21. Also optionally, distal ends 16 can have points that extend outwardly relative to receiving cavity 25. These outwardly extending points can contact carcass 30 also to help prevent slippage of retainer 10 along or off hocks 21.

The distance D between prongs 21 can be selected depending on the type of poultry carcass 30 secured within retainer 10. For example, if retainer 10 is meant to be used with smaller chickens or even quail or squab, distance D can be narrower than if retainer 10 is meant to be used with larger geese or turkeys. Likewise, the inner diameter of receiving cavity 25 can be selected depending on the type of poultry carcass 30 secured within retainer 10. As is appreciated by those skilled in the art, retainer 10 can be manufactured in any number of sizes to be used with different size poultry, or in a single one-size-fits-all size to fit a wide variety of poultry. Distance D also can depend upon the resilience of the plastic material from which retainer 10 is formed. However, it is preferable that distance D be less than the smallest outside diameter of hock 32 to ensure that hocks 32 remain snapped in place within retainer 10.

Diameter 27 of receiving cavity 25 can be related to the relative freedom desired of hocks 32 within retainer 10. If diameter 27 is larger than the diameter of hocks 32, then hocks 32 can have more relative freedom within retainer 10, and thus move about more relative to each other (and hocks 32 may be able to slip out of receiving cavity 25). Similarly, if diameter 27 is smaller than the diameter of hocks 32, then hocks 32 may have less relative freedom within retainer 10 (and hocks 32 may not be well-secured within receiving cavity 25). Diameter 27 is preferably smaller than the diameter of knuckle 33 and larger than the diameter of hock 32 as this size of diameter 27 can help ensure that hocks 32 are secure within retainer 10 and can help prevent retainer 10 from slipping off over knuckles 33.

The use of separate receiving cavities 25, one for each of the hocks 32, has several advantages. One advantage is that each hock 32 is retained separately from the other hock 32, thus allowing a more secure retention. Another advantage is that the hocks 32 are prevented from overlapping each other, thus preventing damage to poultry carcass 30 and/or packaging. Another advantage is that receiving cavities 25 need only be of the same relative size or diameter as a single hock 32, thus preventing slippage while mounted. The use of slot 20 to allow the mounting of retainer 10 on hocks 32 similarly has several advantages. One advantage is that, unlike in the prior art, receiving cavities 25 need only be the same relative size or diameter as a single hock 32 and retainer can be mounted on hocks 32 from above, rather than slipped on hocks 32 over knuckles 33. This can allow mounting of retainer 10 from above poultry carcass 30 rather than from behind poultry carcass 30 (at times when mounting retainers 10 from behind the carcass, the tail section of the carcass can interfere). This also can allow for a more secure mounting and less chance that retainer 10 will slip off over knuckles 33.

It is understood that persons with skill in the art can determine the appropriate distance D and diameter 27, and thus the appropriate dimensions of retainer 10, based on factors related to the species of poultry and the type of material of manufacture. For example, persons with skill in the art can determine the preferred distance D and diameter 27 based on data such as the average size diameter of the hocks 32 and knuckles 33 of a particular species on which the present invention will be used, or for a one-size-fits-all version.

Retainer 10 can have gap 40 centrally located between retaining members 12. Gap 40 can serve many ergonomic, mechanical, economic and/or other functions. For example, gap 40 can be used to facilitate stacking and storage of a plurality of retainers 10 and to keep them in alignment. Alternatively, gap 40 can be structured so as to allow one or more retainers 10 to be loaded onto a magazine of a machine that automatically mounts retainers onto hocks. Alternatively, a cardboard runner for storing or organizing retainers 10 can be inserted through gap 40. Gap 40 also can be used to reduce the quantity of material needed to produce retainer 10 and thus reduce the cost of retainer 10. Gap 40 also can be included to allow inner arcuate arms 17 to be more flexible if it is determined that this is necessary for easier mounting of retainer 10 onto hocks 32. The size and shape of gap 40, if included, will depend on the purpose of gap 40, as will be appreciated by those of skill in the art.

Figure 3:
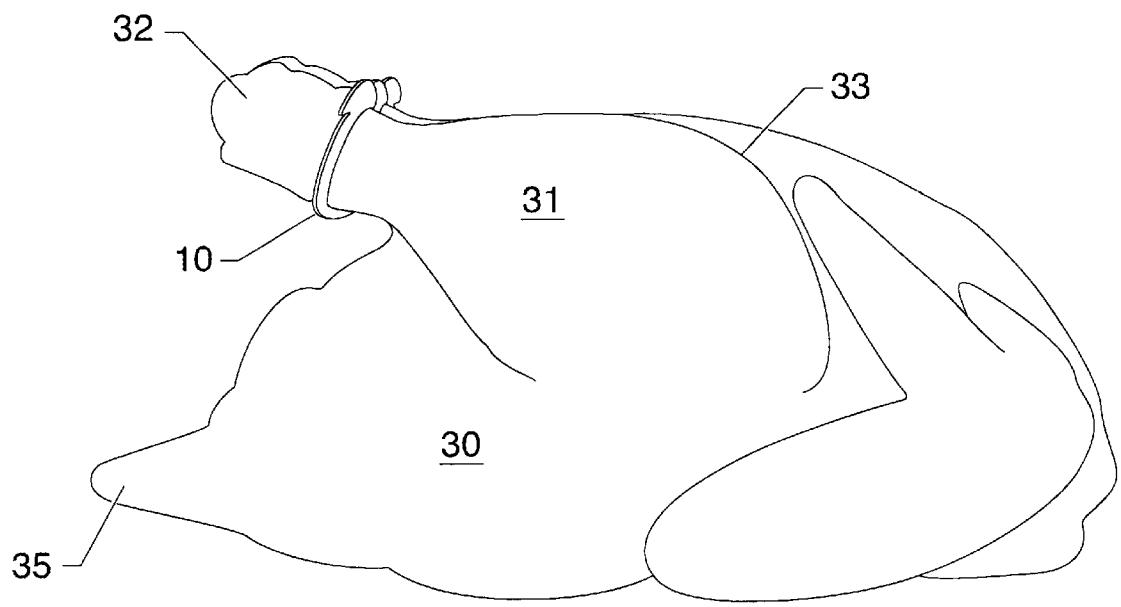
FIG. 3 is a side view of the retainer of FIG. 1 as mounted on the hocks of a poultry carcass.

FIG. 2 illustrates retainer 10 mounted on hocks 32 on a poultry carcass 30 from the top (that is, when the carcass 30 is lying on its back with the breast pointing upwards, retainer 10 is mounted on hocks 32 using a downward motion from above hocks 32). This manner of mounting may be preferred for automatic mounting or if retainer is labeled. It is important to note that retainer 10 also can be mounted on hocks 32 from the bottom (that is, when the carcass 30 is lying on its back with the breast pointing upwards, retainer 10 is mounted on hocks 32 using an upward motion from below hocks 32). This manner of mounting may be preferred for poultry to be packaged, as less of retainer likely will contact the packaging material. Further, by showing less of the retainer 10, the poultry may look more natural to the consumer, thus increasing the potential desirability of purchasing the poultry. FIG. 3 illustrates a side view of retainer 10 mounted on hocks 32 on a poultry carcass 30. As can be seen, hock 32 is located on poultry leg 31 between knuckle 33 and thigh 33.

Figure 4:
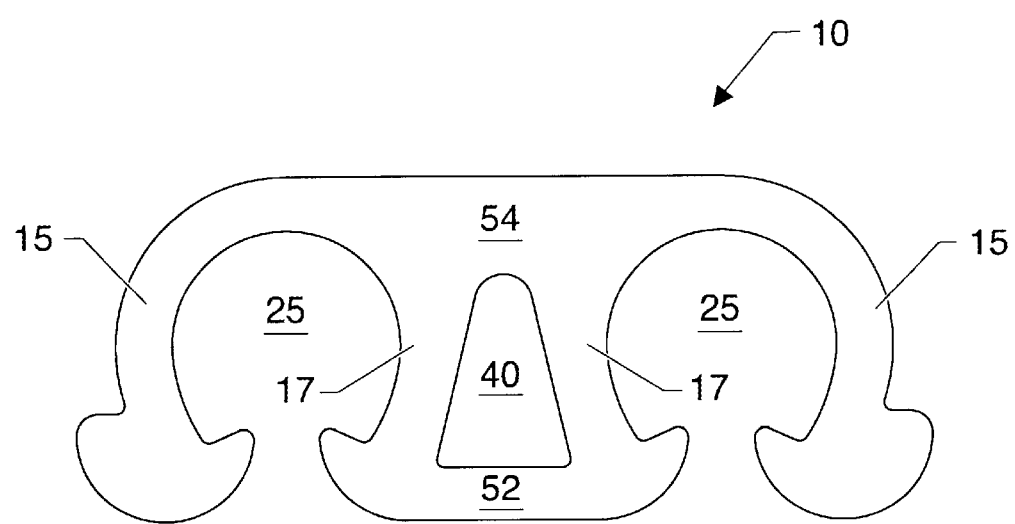
FIG. 4 is a front view of a second embodiment of the retainer of the present invention.
Figure 5:
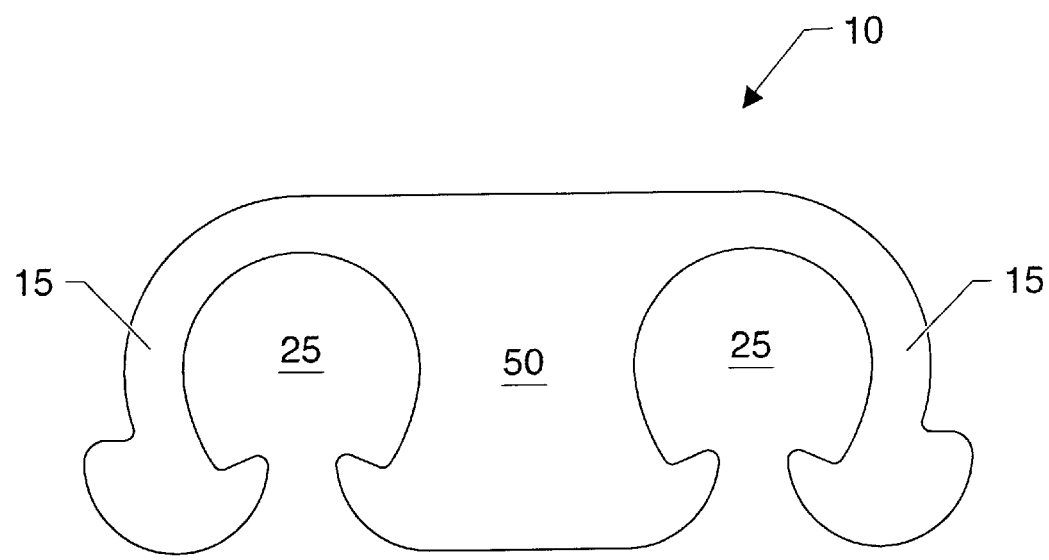
FIG. 5 is a front view of a third embodiment of the retainer of the present invention.

Two alternative embodiments of retainer 10 are shown in FIGS. 4 and 5. FIG. 4 illustrates an embodiment of retainer 10 in which inner arcuate arms 17 are attached to each other or connected together by a bridge 52. In this embodiment, gap 40 can be more particularly defined. One feature of connecting of inner arcuate arms 17 is that it can reduce the flexibility of inner arcuate arms 17 in specific and retainer 10 in general and can help prevent retainer 10 from warping or breaking at neck 54. FIG. 5 illustrates an embodiment of retainer 10 without gap 40 and with a flat central area 50 that can be used, for example, for labeling purposes, creating a stronger or more rigid retainer 10 (more material typically will mean a more rigid structure), and/or creating a retainer 10 with fewer edges and corners (creating a smoother overall footprint that could reduce packaging tears when the carcass is packaged).

Figure 6:
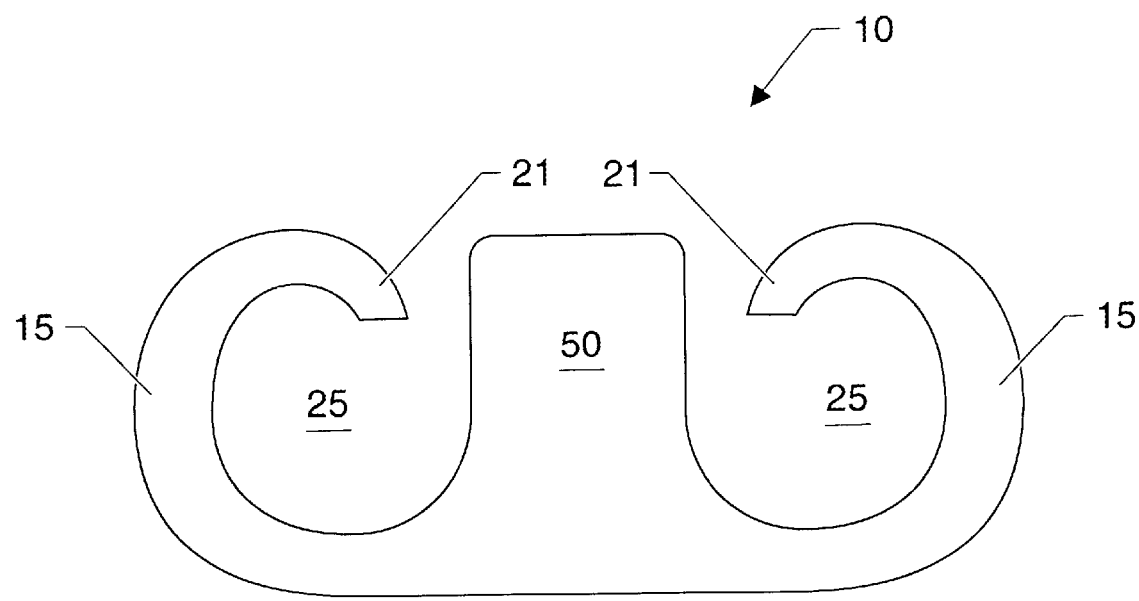
FIG. 6 is a front view of a fourth embodiment of the retainer of the present invention.

FIG. 6 illustrates another alternative embodiment of the present invention that comprises two outer arcuate arms 15 terminating proximal to flat central area 50. This embodiment lacks inner arcuate arms 17 and outer arcuate arms 15 are extended to compensate for this lack.

Figure 7:
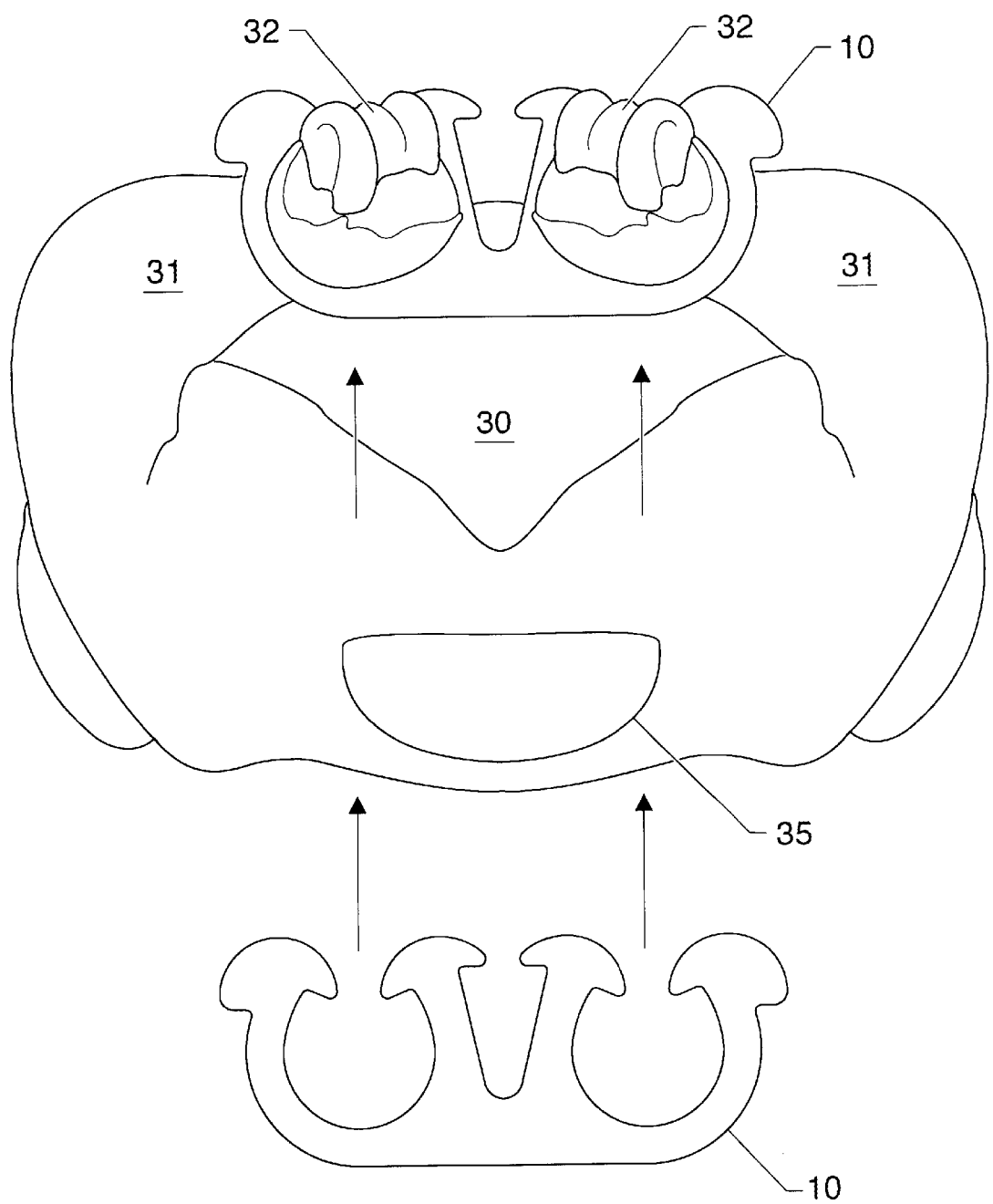
FIG. 7 is perspective view of a general method of placing the retainer of the present invention on the hocks of an exemplary poultry carcass.

Referring to now to FIG. 7, in operation and use retainer 10 is adapted for mounting over hocks 32 of poultry carcass 30. An application of retainer 10 to poultry carcass 30 trusses hocks 32 of poultry carcass 30 together and helps maintain legs 31 proximal to poultry carcass 30. Preferably, hocks 32 are juxtaposed at a reasonable distance dictated primarily by the proximity of retaining members 12 to each other and the width of gap 40 or flat panel 50. One method of mounting retainer 10 onto hocks 32 is by an upward snapping motion of retainer 10 over both hocks 32 at the same time from below or behind with base 19 located below hocks 32 (that is between hocks 32 and tail 35). Another method is by a downward snapping motion from above or behind with base 19 located above hocks 32 (that is on the opposite side of hocks 32 form tail 35). As receiving cavities 25 have been sized so that so that hocks 32 can fit therein, the poultry processor (or processing machine) can pinch hocks 32 together and then either can snap hocks 32 into receiving cavities 25 or snap retainer 10 over hocks 32.

Preferably, both hocks 32 simultaneously enter the two receiving cavities 25 respectively through slots 20. As retainer 10 is pushed or snapped onto hocks 32, one or more arcuate arms 15, 17 are deflected, which temporary enlarges slots 20 to allow hocks 32 pass there through. For example, outer arcuate arms 15 could deflect outwards, forwards, and/or backwards (relative to their initial position) by utilizing the elasticity of the material of construction to allow hocks 32 to enter respective receiving cavities 25. Once hocks 32 are substantially within receiving cavities 25, outer arcuate arms 15 can begin to return to their original positions. As receiving cavity 25 has preferably a diameter at least the diameter of hock 32, the return of outer arcuate arms 15 into their original positions secures hocks 32 within retainer 10. Likewise, inner arcuate arms 17 can deflect as well. Prongs 21 help prevent retainer 10 from slipping off of hocks 32.

It is contemplated that retainer 10 can be loaded with a poultry carcass 30 by automation. The generally plate configuration of retainer 10 facilitates automation of the process and operation as these type of shapes can be fitted in a machine. More specifically, a machine can perform the snapping of retainer 10 onto hocks 32 of poultry carcass 30. As a mechanical single stroke can be used to place retainer 10 on hocks 32, a machine can be calibrated to perform the single snapping motion of retainer 10 over hocks 32 of poultry carcass 30.

In another embodiment, retainer 10 can also serve as a means for labeling or conveying information regarding poultry carcass 30. Certain information pertaining to poultry carcass 30 can be written on, imprinted on, or attached to retainer 10. For example, retainer 10 can be imprinted with information to indicate characteristics such as the type of the poultry or any flavoring added to the poultry. Additionally or alternatively, retainer 10 can have a color to indicate the type and/or flavoring of poultry carcass 30. To provide more space for labeling, base 19 can be made thicker and/or gap 40 can be omitted and/or inner arcuate arms 17 can have a greater width.

The relatively simple structure of retainer 10 can allow it to be manufactured relatively easily with inexpensive materials. Preferably, retainer 10 can be molded from a single piece of resilient material that can withstand cooking and processing temperatures (which can approach and exceed 500° F.). Retainer 10 can be formed of plastic or other resilient material that permits it to deflect and resume its original shape. Such plastics and other materials are evident to and known by those of skill in the art.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A substantially planer and unitary retainer for use with a poultry carcass with a pair of hocks comprising:
   a. a first substantially C-shaped retaining member with two arcuate arms for retaining the first hock;
   b. a second substantially C-shaped retaining member with two arcuate arms for retaining the second hock,
   wherein the first retaining member is juxtaposed with the second retaining member; when the retainer is mounted over the pair of hocks, the engagement of the pair of hocks by the retainer holds the pair of hocks in juxtaposition to each other, and each arcuate arm terminates at a distal end.

2. The retainer as claimed in claim 1, wherein the first C-shaped retaining member and the second C-shaped retaining members each define an entrance slot that permits one of the hocks therethrough.

3. The retainer in claim 2, wherein the first and the second members comprise a pair of arcuate arms terminating at points opposite each other at distal ends defining the entrance slot.

4. The retainer in claim 3, wherein each arm of the pair of arcuate arms further comprise a prong at the distal ends.

5. The retainer in claim 3, wherein each arm of the pair of arcuate arms is sufficiently flexible to thereby allow the distal ends to move relative to each other to allow a hock to slide therethrough.

6. The retainer in claim 5, wherein the pair of arcuate arms form a receiving cavity.

7. The retainer as claimed in claim 1, wherein the retainer has information regarding the poultry carcass.

8. The retainer in claim 1, wherein the retainer has a color to indicate the flavoring of the fowl.

9. A substantially planer and unitary retainer for use with a poultry carcass with a pair of hocks comprising:
   a. a first substantially C-shaped retaining member with one arcuate arm for retaining the first hock;
   b. a second substantially C-shaped retaining member with one arcuate arm for retaining the second hock; and
   c. a base located centrally between the retaining members from which the retaining members extend,
   wherein the first retaining member is juxtaposed with the second retaining member and when the retainer is mounted over the pair of hocks, the engagement of the pair of hocks by the retainer holds the pair of hocks in juxtaposition to each other.

10. The retainer as claimed in claim 9, wherein the first C-shaped retaining member and the second C-shaped retaining members each define an entrance slot that permits one of the hocks therethrough.

11. The retainer in claim 10, further comprising a central tab and wherein the arcuate arms terminate at a point proximal to the central tab thereby defining the entrance slot between a distal end of the arcuate arm and the central tab.

12. The retainer in claim 11, wherein each arcuate arm further comprises a prong at the distal end.

13. The retainer in claim 11, wherein the arcuate arms are sufficiently flexible thereby allowing the distal ends to move relative to the central tab to allow a hock to slide therethrough.

14. The retainer in claim 13, wherein each pair of arcuate arm forms a receiving cavity.

15. A retainer for use with a poultry carcass having a pair of hocks, comprising a substantially planar member that mounts over the pair of hocks, wherein the retainer has two separate but interconnected retaining members, each of which defines a partial opening of sufficient size to allow one of the pair of hocks to fit therein, the two retaining members are juxtaposed relative to each other, and engagement of the pair of hocks by the retainer holds the pair of hocks in juxtaposition.

16. The retainer in claim 15, wherein the retaining members comprise a pair of arcuate arms terminating at points opposite each other at distal ends defining an entrance slot.

17. The retainer in claim 16, wherein each arm of the pair of arcuate arms has a prong at the distal ends.

18. The retainer in claim 17, wherein arm of the pair of arcuate arms are sufficiently flexible thereby allowing the distal ends to move relative to each other to allow a hock to slide therethrough.

19. The retainer in claim 18, wherein the pair of arcuate arms form a receiving cavity.

20. The retainer in claim 19, wherein the retaining members are substantially C-shaped.

21. A retainer for use with a poultry carcass having a pair of hocks, comprising a substantially planar member that mounts over the pair of hocks, comprising two separate but interconnected generally C-shaped retaining members, each of which comprises a pair of arcuate arms extending from a central base located linearly between the retaining members and terminating at points opposite each other at distal ends defining a partial opening of sufficient size to allow one of the pair of hocks to fit therein, and each pair of arcuate arms forms a receiving cavity,
   wherein the first retaining member is juxtaposed with the second retaining member; at least one arm of each pair of arcuate arms is sufficiently flexible thereby allowing the distal end of the at least one arm to move relative to the other arm to allow a hock to slide therethrough, the two retaining members are juxtaposed, and the pair of hocks is engaged by the retainer thus holding the pair of hocks in juxtaposition.

22. The retainer as claimed in claim 21, wherein at least one arm of the pair of arcuate arms has a prong on at least one of the distal ends.

23. The retainer as claimed in claim 22, wherein the prong points inwardly towards the receiving cavity for engaging the hock.

* * * * *